Patented Sept. 11, 1923.

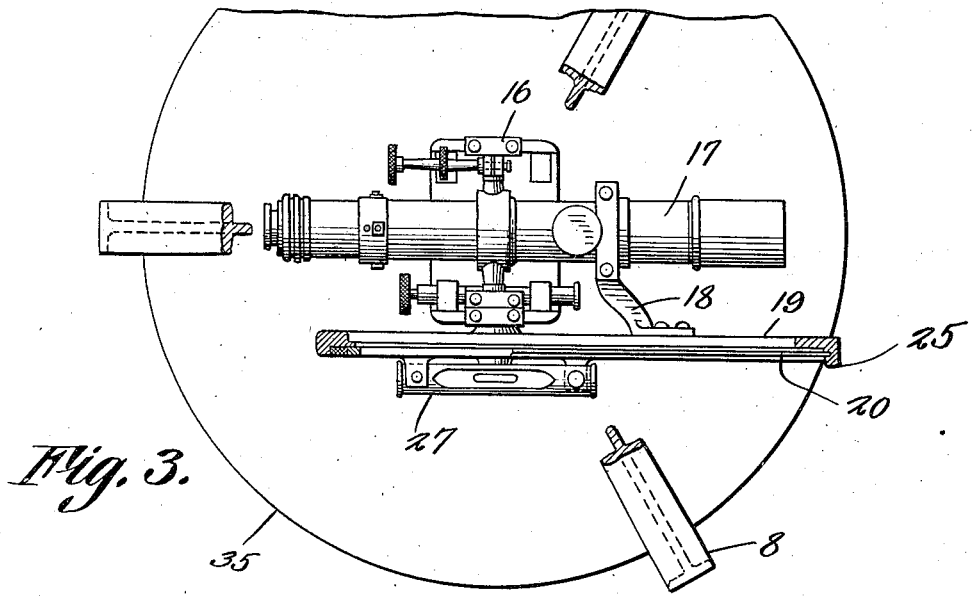
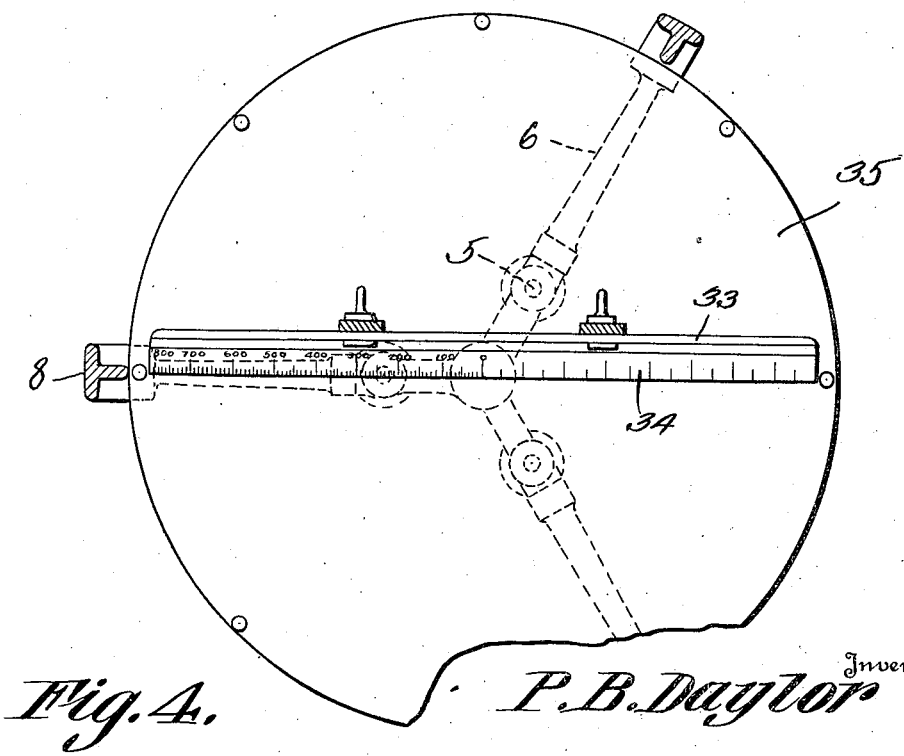

1,467,424

UNITED STATES PATENT OFFICE.

PHILIP B. DAYLOR, OF STEELTON, PENNSYLVANIA, ASSIGNOR OF ONE-HALF TO CLARK L. KEPNER, OF STEELTON, PENNSYLVANIA.

SURVEYOR'S INSTRUMENT.

Application filed August 17, 1922. Serial No. 582,443.

*To all whom it may concern:*

Be it known that I, PHILIP B. DAYLOR, a citizen of the United States, residing at Steelton, in the county of Dauphin and State of Pennsylvania, have invented a new and useful Surveyor's Instrument, of which the following is a specification.

This invention relates to an instrument designed primarily for use by surveyors and while it can be employed in surveys made in connection with most engineering enterprises it is more especially adapted for use in making topographical surveys.

One of the objects of the invention is to combine with the usual surveying outfit, a drawing board with which is associated means whereby the data secured in the course of the survey can be laid out upon paper secured to the board and thus permit the surveyor to immediately map the survey, thereby insuring greater rapidity, ease and economy in laying out the results of the survey than would otherwise be possible.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 3 is a top plan view, parts being shown in section.

Figure 4 is a horizontal section showing the drawing board in plan with the cooperating scale in position thereabove.

Figure 1:
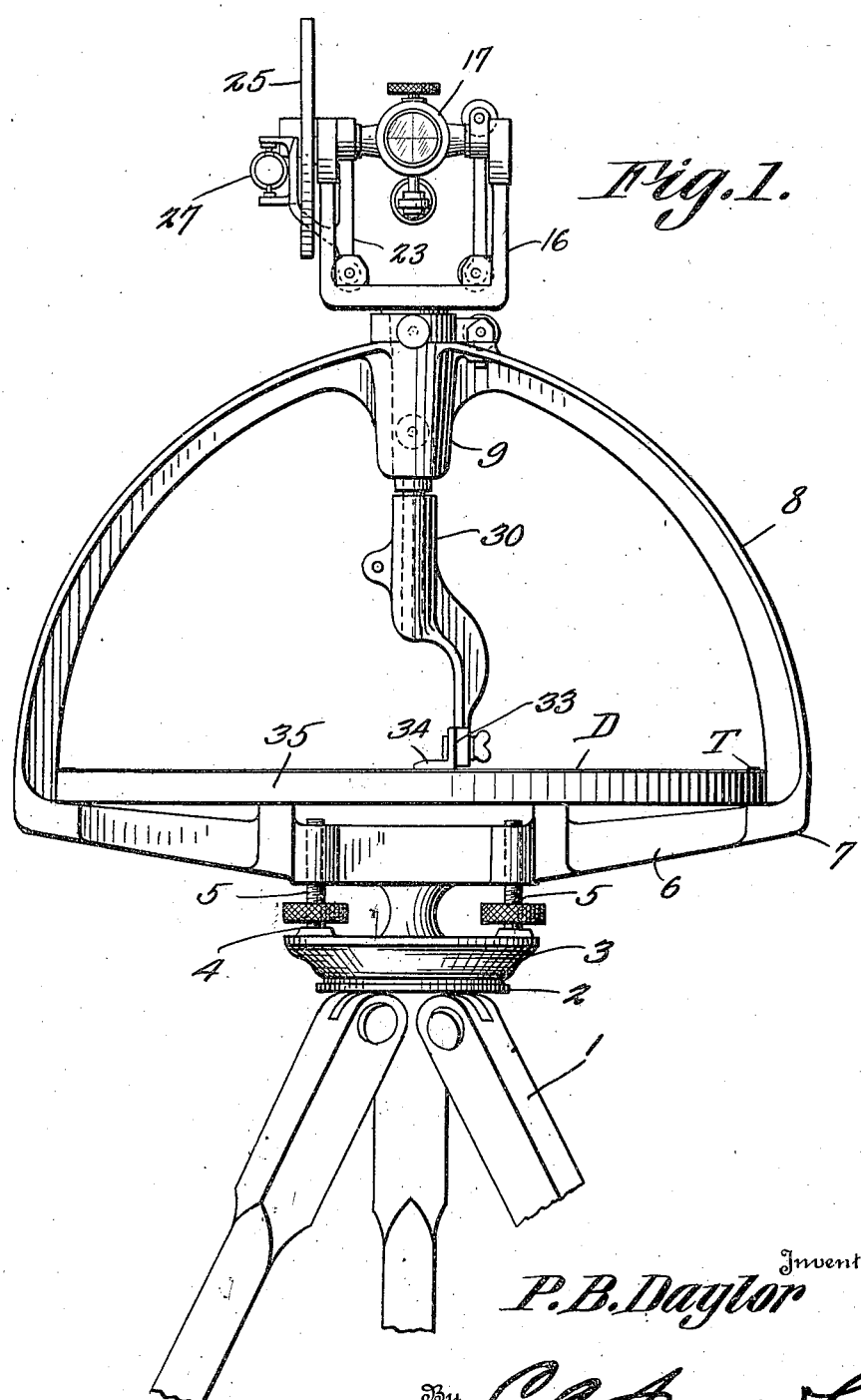
Figure 1 is an end elevation of the instrument.
Figure 2:
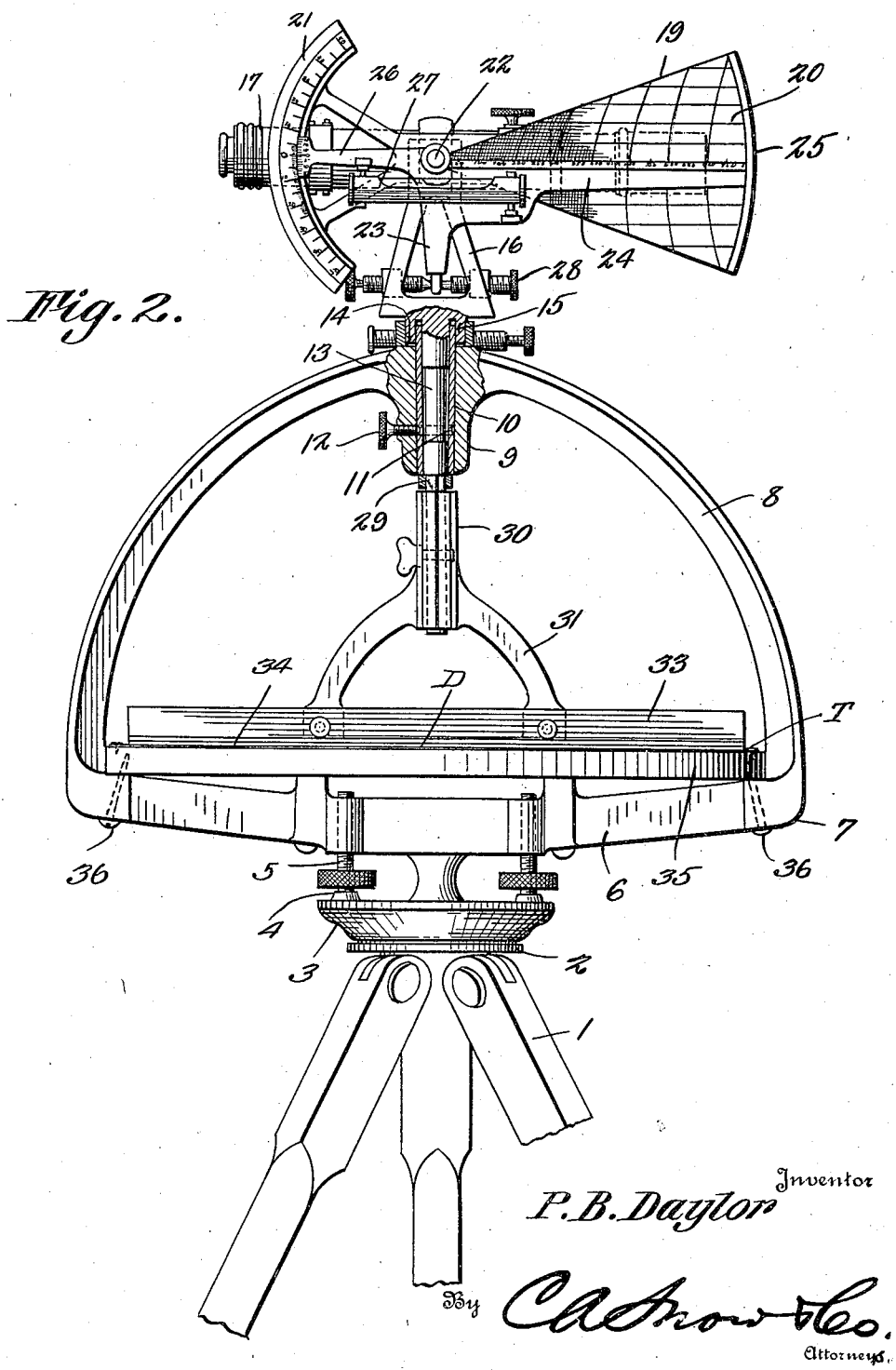
Figure 2 is a side elevation thereof, a portion being shown in section.

Referring to the figures by characters of reference 1 designates a tripod provided with the usual head or casting 2 engaged by a leveling base 3. This base has the usual leveling cups or sockets 4 engaged by the lower ends of leveling screws 5. These screws engage the spider-like base portion 6 of a stand 7, there being upwardly converging arcuate arms 8 extending from the ends of the arms of the spider and merging at their upper ends into a bearing or guide 9 in which is mounted a sleeve 10 tapered toward one end both inside and out and having an exterior annular groove 11 for the reception of one end of a holding screw 12. Seated tightly in this sleeve 10 is a spindle 13 the upper end of which is surrounded by a shoulder 14 having a circular recess 15 formed therein for the reception of the upper end of the sleeve 10.

Standards 16 are formed integral with the spindle 13 and provide bearings for the telescope 17. A bracket 18 suitably secured to the telescope serves to stiffen a computing sector 19 which is secured rigidly to the axis 22 of the telescope so as to be adjusted angularly therewith. This computing sector has a chart 20 scribed thereon for use when making a stadia survey. A graduated arc 21 is fixed relative to the sector 19 and is concentric with the axis 22 about which the telescope, sector and the arc are shiftable. A finger 23 is extended downwardly from the pivoted end portion of an elongated computing scale 24 mounted for movement about the axis 22 and having its outer free end movably engaged by a longitudinally grooved arcuate guide 25 provided at the outer or large end of the sector 19. A vernier extends from the computing scale in a direction opposite thereto, as indicated at 26 and cooperates with the graduated arc 21 for the purpose of reading vertical angles when more accurate work is desired than is possible by using the combination of chart 20 and scale 24. A spirit level 27 is fixedly mounted on the computing scale 24 so as to move therewith. The finger 23 projects between adjusting screws 28 suitably connected to one of the standards 16 and by means of these screws a delicate adjustment of the computing scales and the vernier can be effected so as to bring the graduated edge of the computing scale 24 to a horizontal position indicated by the spirit level 27.

The lower end of the spindle 13 is preferably squared as indicated at 29 and is tightly engaged by a clamp 30 from which projects a fork 31. This fork is attached to the upstanding flange 33 provided along one edge of a scale 34. The center of the straight edge of this scale is in line with the longitudinal center of the spindle 13 and is provided with a graduation indicated by "0". From this central graduation the scale is graduated toward the two ends, the graduations at one side of the center differing from the graduations at the other side. This arrangement of graduations has been shown clearly in Figure 4.

Secured on the base or spider 6 of the stand 7 is a circular drawing board 35 preferably formed of a well seasoned soft wood fastened into position by means of screws 36 as shown. This drawing board is in a plane at right angles to the longitudinal axis of spindle 13 and is adapted to support a sheet of drawing paper D close to but out of contact with the scale 34. This drawing paper is to be attached to the board by thumb tacks T as ordinarily.

It will be apparent that by providing the drawing board attachment, the scale 34 and the other improvements herein described it becomes possible to immediately map a survey, more especially topographical, at a great saving of time and labor. By means of the chart on the sector 19 used in connection with the computing scale 24 the surveyor is enabled to determine to the nearest foot the corrected or "reduced" horizontal and vertical distances after having read the stadia distance. No attempt has been made to outline specifically the chart used on the sector 19 and it is to be understood that this may vary to suit the tastes of the users and to meet the requirements of the work undertaken. It might be stated, however, that the principle upon which the scale 24 and chart 20 is based is that of solving a right triangle by scaling it, having given an angle and the hypotenuse. The angle given being the vertical angle indicated by the edge of the scale 24 and the center line of computing chart 20 and the hypotenuse being the stadia distance. For example, supposing the topographer or instrument-man sighting on the rod to a point which is on a higher elevation than the instrument and reads on the rod stadia distance of 600 feet. The vertical angle to this point will then be indicated by the top edge of scale 24 and the center line of the chart. The topographer is not interested in the vertical angle but supposing it to be 15°. The edge of the scale 24 at 600 feet would intersect the one set of radial lines on chart 20 showing the "corrected or reduced" vertical distance to be about 150 feet (within a foot) and also intersect the other set of radial lines at a point indicating the "corrected or reduced" horizontal distance to be 561 feet (within a foot). It will be noted that due to the fact that the rod is always held in a vertical position the inclined stadia distance as read on the rod is not the true distance but a much longer distance increasing proportionally with the vertical angle, therefore necessitating radial lines to be scribed on the chart at approximately right angles to each other. Were it possible to read the true inclined distance by stadia, the lines on the chart would be straight lines and at right angles to each other.

It will be noted that the scale 34 shifts with the telescope when the same is rotated about the longitudinal axis of the spindle 13 so that the direction of sight will always be accurately indicated on the paper secured to the board. While the telescope is thus extended the various elevations determined can be designated along the indicated line at the proper distances.

What is claimed is:

1. In an instrument of the class described the combination with a stationary drawing board, of a telescope mounted for rotation about an axis perpendicular to the board, a scale supported close to the board and rotatable with the telescope, said scale having a straight edge intersecting the axis of rotation thereof and extending diametrically across the board.

2. In an instrument of the class described the combination with a stationary drawing board, of a telescope mounted for rotation about an axis perpendicular to the board, a scale supported close to the board and rotatable with the telescope, a computing chart movable with the telescope, a computing scale cooperating with the chart, and means for leveling the scale.

3. In an instrument of the class described the combination with a base and means for leveling the same, of a drawing board fixedly mounted on the base, a telescope tiltably supported above the base and mounted for rotation about an axis perpendicular to the board, a scale rotatable with the telescope and supported close to the board, and means for supporting the said scale adjustably relative to the board, said scale having a straight edge intersecting the axis of rotation thereof and extending diametrically across the board.

4. In an instrument of the class described the combination with a base and means for leveling the same, of a drawing board fixedly mounted on the base, a telescope tiltably supported above the base and mounted for rotation about an axis perpendicular to the board, a scale rotatable with the telescope and supported close to the board, a computing chart tiltable with the telescope, a computing scale cooperating therewith, level indicating means carried by the computing scale, and means for leveling said scale.

In testimony that I claim the foregoing as my own, I have hereto affixed my signature in the presence of two witnesses.

PHILIP B. DAYLOR.

Witnesses:
WILLIAM F. HOUSMAN,
H. L. DRESS.